United States Patent
Waltner (10) Patent No.: US 10,759,280 B2
(45) Date of Patent: Sep. 1, 2020

(54) HYBRID ELECTRIC POWER DRIVE SYSTEM FOR A ROTORCRAFT

(71) Applicant: Sikorsky Aircraft Corporation, Stratford, CT (US)

(72) Inventor: Peter James Waltner, Royal Palm Beach, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 186 days.

(21) Appl. No.: 15/501,337

(22) PCT Filed: Sep. 22, 2015

(86) PCT No.: PCT/US2015/051449
§ 371 (c)(1),
(2) Date: Feb. 2, 2017

(87) PCT Pub. No.: WO2016/049027
PCT Pub. Date: Mar. 31, 2016

(65) Prior Publication Data
US 2017/0225573 A1    Aug. 10, 2017

Related U.S. Application Data

(60) Provisional application No. 62/054,085, filed on Sep. 23, 2014.

(51) Int. Cl.
*B64C 27/26* (2006.01)
*B60L 11/14* (2006.01)
(Continued)

(52) U.S. Cl.
CPC ............... *B60L 11/14* (2013.01); *B60L 50/16* (2019.02); *B60L 50/30* (2019.02); *B60L 50/50* (2019.02);
(Continued)

(58) Field of Classification Search
CPC .......................... B64D 2027/026; B60L 11/14
See application file for complete search history.

(56) References Cited

U.S. PATENT DOCUMENTS

| 4,754,940 A |   | 7/1988 | Deter |
| 5,823,468 A | * | 10/1998 | Bothe ....................... B64B 1/08 244/2 |

(Continued)

OTHER PUBLICATIONS

PCT Application No. PCT/15/51449, ISR/WO, Issued Dec. 11, 2015, 11 pages.
(Continued)

*Primary Examiner* — Philip J Bonzell
*Assistant Examiner* — Michael B. Kreiner
(74) *Attorney, Agent, or Firm* — Baker Botts L.L.P.

(57) ABSTRACT

A hybrid power drive system for an aircraft that comprises a rotor and a first power drive sub-system. The first power drive sub-system includes at least one engine in connection with the rotor and provides a first power to the rotor. The hybrid power drive system also includes a second power drive sub-system connected in parallel to the first power drive sub-system, which supplements with a second power the first power delivered to the rotor during operation of the aircraft. In addition, an electric power source provides a third power to the second power drive sub-system.

10 Claims, 4 Drawing Sheets

(51) Int. Cl.
  *B64C 27/12* (2006.01)
  *B60L 50/16* (2019.01)
  *B64D 27/26* (2006.01)
  *B60L 50/50* (2019.01)
  *B60L 50/30* (2019.01)
  *B64D 27/24* (2006.01)
  *B64D 27/02* (2006.01)

(52) U.S. Cl.
  CPC .............. *B64C 27/12* (2013.01); *B64D 27/24* (2013.01); *B64D 27/26* (2013.01); *B60L 2200/10* (2013.01); *B64D 2027/026* (2013.01); *Y02T 50/64* (2013.01)

(56) References Cited

U.S. PATENT DOCUMENTS

| | | | |
|---|---|---|---|
| 8,403,258 B2 | 3/2013 | Arendt et al. | |
| 8,727,271 B2* | 5/2014 | Salyer | B64C 27/04 244/17.11 |
| 8,757,542 B2* | 6/2014 | Hopdjanian | B60L 3/0046 244/53 R |
| 9,038,939 B2* | 5/2015 | Dyrla | B60K 6/00 244/17.11 |
| 9,085,355 B2* | 7/2015 | DeLorean | B64C 29/0033 |
| 9,162,771 B2* | 10/2015 | Roggemans | B64D 31/14 |
| 9,425,670 B2* | 8/2016 | Mariotto | H02K 7/006 |
| 9,447,734 B2* | 9/2016 | Mariotto | F02C 7/36 |
| 9,522,730 B2* | 12/2016 | Smith | B64C 27/006 |
| 9,708,074 B2* | 7/2017 | Jaenker | B64C 27/006 |
| 9,885,289 B2* | 2/2018 | Rechain | B64C 27/04 |
| 10,040,566 B2* | 8/2018 | Waltner | F01D 15/12 |
| 2010/0013223 A1* | 1/2010 | Certain | B60K 6/24 290/31 |
| 2011/0073717 A1 | 3/2011 | Foucault et al. | |
| 2011/0121127 A1* | 5/2011 | Certain | B64C 27/12 244/17.19 |
| 2012/0025032 A1 | 2/2012 | Hopdjanian et al. | |
| 2014/0010652 A1* | 1/2014 | Suntharalingam | B64D 27/02 416/1 |
| 2014/0054411 A1 | 2/2014 | Connaulte et al. | |
| 2014/0346283 A1* | 11/2014 | Salyer | B64C 37/00 244/7 A |
| 2015/0143950 A1* | 5/2015 | Bedrine | B64C 27/04 74/661 |
| 2017/0096233 A1* | 4/2017 | Mercier-Calvairac | B64C 27/04 |
| 2017/0152055 A1* | 6/2017 | Mercier-Calvairac | B64D 35/08 |

OTHER PUBLICATIONS

European Search Report for European Application No. 15844828.2; dated Nov. 15, 2018; 5 Pages.

* cited by examiner

HYBRID ELECTRIC POWER DRIVE SYSTEM FOR A ROTORCRAFT

This application claims the benefit of PCT Application No. PCT/US15/51449, filed on Sep. 22, 2015, which in turn claims priority to U.S. provisional patent application Ser. No. 62/054,085, filed Sep. 23, 2014. The entire contents of PCT Application No. PCT/US15/51449 and U.S. Provisional Patent Application No. 62/054,085 are incorporated herein by reference.

FIELD OF THE INVENTION

The subject matter disclosed herein relates generally to the field of propulsion systems, and to a rotorcraft with a parallel hybrid electric drive system that receives energy from one of two classes of electric power sources.

BACKGROUND OF THE INVENTION

Rotary wing aircraft utilize propulsion systems to power aircraft flight. These propulsion systems convert stored energy into mechanical work to drive one or more rotor systems for flight. Energy (typically stored in chemical form as fuel) is supplied to an energy conversion device (typically a plurality of internal combustion engines such as a turbine engine, spark ignition engine, or compression ignition engine), which converts the energy into mechanical work. A drive system transmits mechanical work through a plurality of transmission mechanisms (e.g., main rotor gearbox(es), a tail rotor gearbox, intermediate gearbox(es), drive shafts, drive couplings, etc.) to drive the rotary wing aircraft's thrust generating rotors.

In an emergency, e.g., in the event of an engine failure of a multi-engine aircraft, the aircraft must rely on contingency power from the remaining operating engine(s) for a predetermined duration so as to place the aircraft in a safe flight regime and react to the engine failure. Emergency power for an example turbine engine is typically defined as a One Engine Inoperative ("OEI") rating with varying limits and durations. When operating to OEI limits, the turbine engine is run at increased speeds and/or temperatures during an emergency for typical durations of 30 seconds to 2.5 minutes in order to provide a limited duration increased power to achieve a safe flight condition. Further, providing supplemental power to the rotorcraft turbine engines during a non-emergency, e.g., during hover, during take-off, or during cruise, can provide for improved weight capability, operating characteristics, maximum speed, or a longer duration flight for mission operations. However, increases to OEI power ratings or providing additional supplemental power is difficult, expensive, and may not be possible over the entire envelope without significant engine redesign.

BRIEF SUMMARY OF THE INVENTION

In accordance with an aspect of the invention, a hybrid power drive system for an aircraft that comprises a rotor, a first power drive sub-system including at least one engine in connection with the rotor and configured to provide a first power source to the rotor, a second power drive sub-system connected in parallel to the first power drive sub-system and configured to supplement, with a second power source, the first power delivered to the rotor during operation of the aircraft, and an electric power source configured to provide a third power to the second power drive sub-system.

In accordance with another aspect of the invention, a method for controlling a hybrid power drive system of an aircraft that comprises receiving a signal indicative of a power demand on a rotor; connecting in parallel a first power drive sub-system and a second power drive sub-system; connecting an electric power source to the second power drive sub-system; and supplying a second power from the second power drive sub-system to the first power drive sub-system to provide power to the rotor.

Technical function of the one or more claims described above provides supplemental power to a helicopter's drivetrain through a hybrid electric drive system that receives power from at least one of a rechargeable energy source or a non-rechargeable energy source while improving one or more desired performance parameters, such as payload, fuel economy, system cost, etc.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

A hybrid electric drive system that can provide power to a rotary wing aircraft's rotor system which improves one or more performance parameters, such as payload, fuel economy, system cost, etc.

Figure 1:
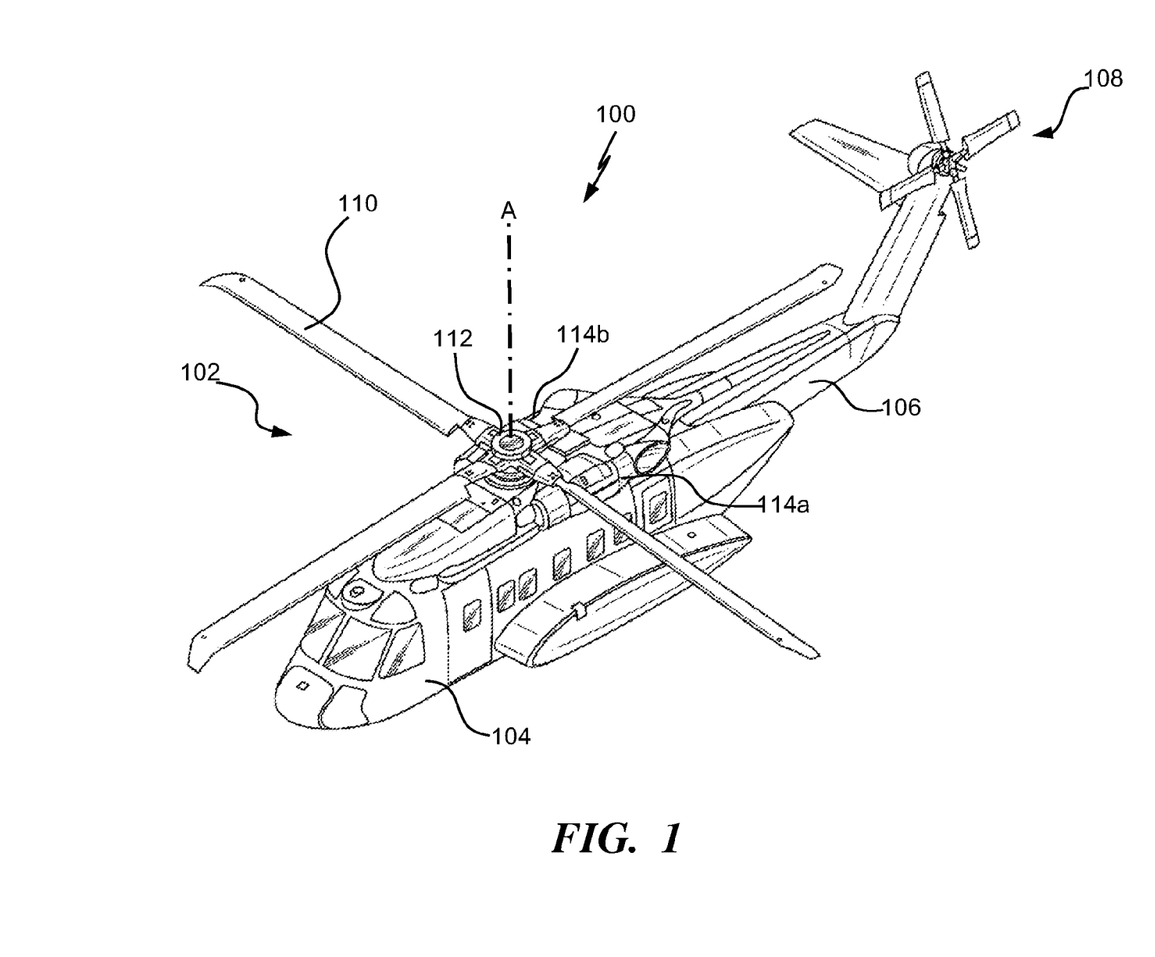
FIG. 1 depicts an exemplary rotorcraft in accordance with an embodiment of the invention.

FIG. 1 schematically illustrates an aircraft 100 (e.g., helicopter or rotorcraft), which includes a hybrid electric power drive system (shown in FIGS. 2-4) that provides supplemental aircraft power in accordance with embodiments of the invention. The hybrid electric power drive system includes a main drive system in serial or in parallel with an auxiliary drive system. The auxiliary drive system provides, in embodiments, a limited duration boost of power to the rotors of rotorcraft 100 in order to achieve a safe-flight condition as well as longer duration normal operation power to the rotors of the aircraft 100 during increased demand of a single-engine and multi-engine rotorcraft, e.g., the aircraft 100. The hybrid electric power drive system is described below in relation to FIGS. 2-4.

As shown in FIG. 1, the aircraft 100 includes an airframe 104 having a main rotor assembly 102 and an extending tail 106 which mounts a tail rotor system 108, such as an anti-torque system, a translational thrust system, a pusher propeller, a rotor propulsion system, or the like. The main rotor assembly 102 includes a plurality of rotor blades 110 mounted to a rotor hub 112. The main rotor assembly 102 is driven about an axis of rotation A through a main rotor gearbox (not shown) by a multi-engine power plant system, here shown as two engines 114a and 114b. In an alternative embodiment, the hybrid electric power drive system (shown in FIGS. 2-4) may also be used on a single engine power plant system. The engines 114a and 114b generate the power available to the aircraft 100 for driving a transmission system that is connected to the main rotor assembly 102 and the tail rotor system 108 as well as for driving various other rotating components to thereby supply electrical power for flight operations. Examples of the engines 114a and 114b may include any internal combustion engine, turbine engine, spark ignition engine, compression ignition engine, etc. Further, the engines 114a and 114b (along with other engines described below) may also include a diesel to electric engine system, a fuel cell system, etc., and thus the engines 114a and 114b should not be construed to any particular engine type.

In embodiments, the aircraft 100 may utilize a plurality of approaches for providing supplemental electric power to a rotor of the aircraft 100. One approach is for providing supplemental power for a limited duration to achieve a safe flight condition during an emergency condition, e.g., during an engine failure, drooped rotor state, and/or for increased power during unsafe flight conditions. Another approach is to provide supplemental power for increased payload capability during normal operation (e.g., during hover or takeoff) when there is an increased power demand of the engines 114a and 114b. Additionally, for example, improved overall power delivery operating characteristics may be optimized by using the supplemental power source to provide transient power to the rotor to overcome slow power response inherent in turbine engines under certain operating conditions. The approaches may be utilized through an electric motor (shown in FIGS. 2-4) that receives electricity from one or more electric power sources onboard the aircraft 100. The electric motor (shown in FIGS. 2-4) utilizes the one or more electric power sources to provide supplemental power to the main rotor assembly 102 and the tail rotor system 108 in order to achieve a safe flight condition or provide continuous power to the rotors during demand on the engines. Although a particular helicopter configuration is illustrated and described in the disclosed embodiments, other configurations and/or machines with single engine or multi-engine power plants, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
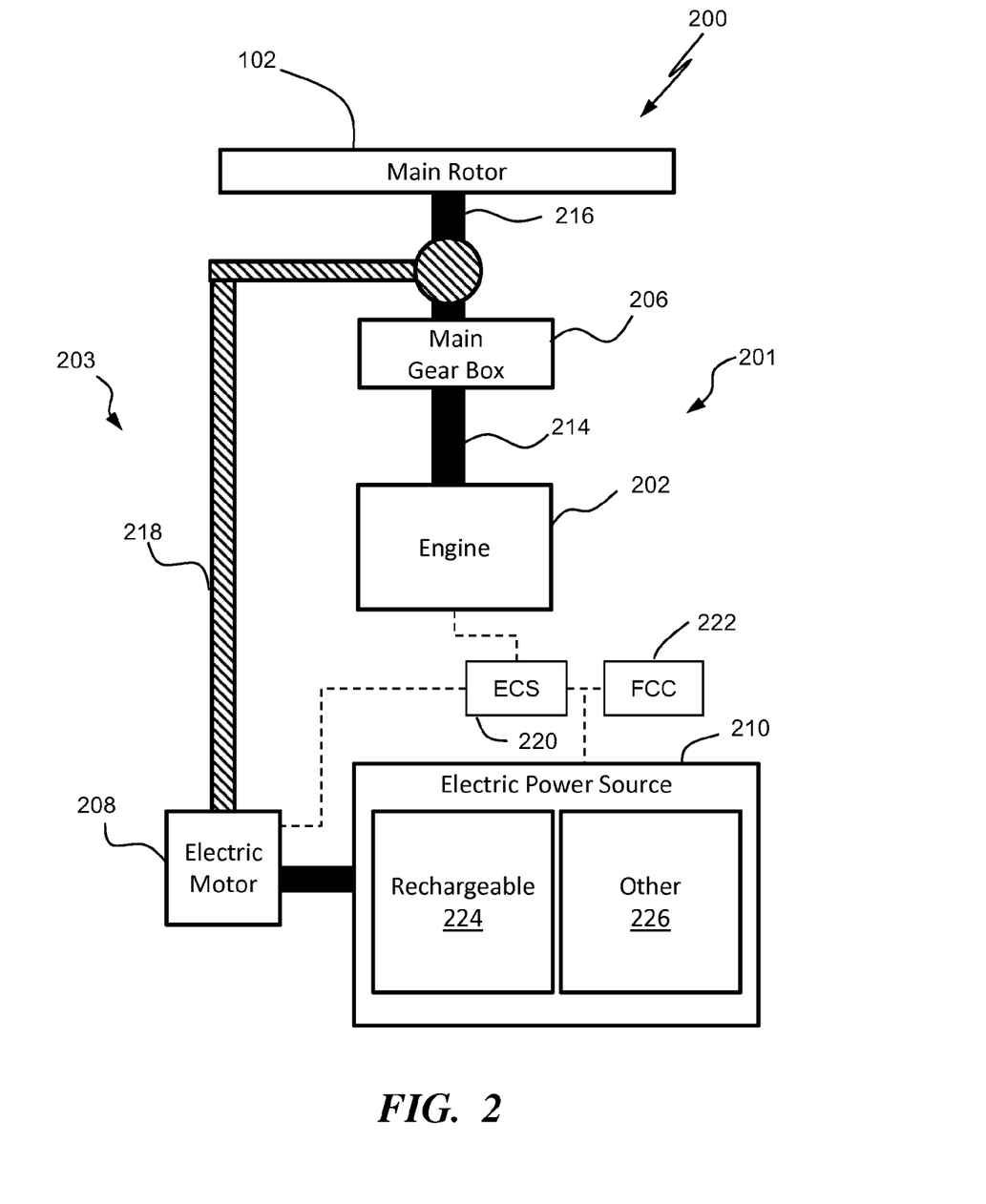
FIG. 2 depicts a hybrid electric power drive system for a rotorcraft in accordance with an embodiment of the invention.

FIG. 2 depicts a schematic view of a hybrid electric power drive system 200 (hereinafter "hybrid electric system 200") for a rotorcraft (e.g., the aircraft 100 of FIG. 1) in accordance with an embodiment of the invention. The hybrid electric system 200 includes an engine 202 of a single-engine power plant (although the hybrid electric system 200 could be implemented with the multi-engine 114a-114b power plant as shown in FIG. 1), a main gearbox 206, an electric motor 208, and an electric power source 210. It is to be understood that many of the ancillary systems may be coupled to the engine such as an engine controller, e.g., an engine control system ("ECS") 220. Other examples of ancillary systems include fuel systems, pumps, etc., which are not shown in FIG. 2 for ease of description of the embodiments of the invention.

As illustrated in FIG. 2, the hybrid electric system 200 is depicted with a main drive system 201 in parallel with an auxiliary drive system 203 (e.g., a first power drive system in parallel with a second power drive system). Main drive system 201 includes the engine 202, the main gearbox 206, an engine power shaft 214, and a main rotor shaft 216. The engine 202 is mechanically connected to the engine power shaft 214 to extract energy from fuel and rotate the engine power shaft 214. The engine power shaft 214 provides the motive force to drive the main rotor assembly 102, via a main rotor shaft 216, in addition to driving the tail rotor system 108 (FIG. 1). The main rotor assembly 102 is driven about an axis of rotation through the main gearbox 206 by the engine 202. The auxiliary drive system 203 includes the electric power source 210, the electric motor 208, and a motor output shaft 218. The electric power source 210 provides energy to the electric motor 208. The motor output shaft 218 mechanically connects the electric motor 208 to the main rotor shaft 216. Note that the electric motor 208 and the motor output shaft 218 may be installed coaxially, e.g., about axis A (FIG. 1) with the main rotor shaft 216. Also, note that the controller 220 is likely "in communication" with (e.g., connected to) one or more of the engine 202, a FADEC, the electric motor 208, the electric power source 210, the rotor speed, and other power demand sensors (e.g., collective rate sensors and any miscellaneous sensor that could singly or in conjunction with other sensors signal a power demand on the rotor).

Further, in this embodiment, the motor output shaft 218 could be characterized as a ring instead of a shaft and may be substantially integrated with the main rotor shaft. Alternatives to installing the electric motor 208 coaxially with the main rotor shaft 216 include, e.g., belt drive, gears, an array of small electric motors, etc. The electric power source 210 includes at least one of a rechargeable energy source 224 (Class A power source) and a non-rechargeable energy source 226 (Class B power source) that supplies energy to the electric motor 208 for rotationally driving the motor output shaft 218. The electric power source 210 provides energy or power to the electric motor 208, which supplements rotational power to the main rotor 102 through a plurality of approaches described below. The electric power source 210 may include a rechargeable energy source 224 that may either be charged with energy on the ground with an external power source or in-flight with aircraft power. The rechargeable energy source 224 includes a battery bank, ultra-capacitors, flywheel energy storage systems, or the like. The non-rechargeable energy source 226 includes an auxiliary power unit ("APU"), supplemental power unit ("SPU"), hybrid electric engine (e.g. an engine capable of providing both shaft and electrical power), or the like which may convert stored energy from a stored medium to electrical energy, but not from electrical energy to a stored medium.

As mentioned above, the hybrid electric system 200 supplements rotational power to the main rotor assembly 102 of the aircraft 100 through a plurality of approaches. In one approach, during an emergency condition, auxiliary drive system 203 is used to provide a short boost of power to achieve a safe-flight condition, such as when the engine 202 fails or the aircraft 100 is in an unsafe condition and the power plant cannot supply sufficient power to navigate away from the unsafe condition, whereby the electric motor 208 may be used to provide contingency power to achieve the safe flight condition during an emergency condition. In the emergency condition, the electric motor 208 receives electric power from the rechargeable energy source 224 and rotationally drives the main rotor shaft 216 via the motor output shaft 218 and thereby, provides contingency power in a similar manner as an OEI 30 second power rating provides. In another approach, for a non-emergency condition when there is an increased power demand of the engine 202, the non-rechargeable energy source 226 may provide electric power to drive the electric motor 208 for a longer duration, such as during hover, during take-off, during maneuvering the aircraft 100 in high winds, or in order to supplement primary power delivered from the engine 202 and improve overall engine operating characteristics or efficiency of the engine 202. The electric motor 208 subsequently rotationally drives the main rotor shaft 216 and thereby, provides supplemental power to the main rotor assembly 102. Note that the distinction of using the rechargeable energy source 224 for emergencies and the non-rechargeable energy source 226 for non-emergency conditions is for illustrative purposes only. In practice, either rechargeable power source 224 or non-rechargeable power source 226 can be used in either emergency or non-emergency operations improve appropriate performance parameters.

Also, the hybrid electric system 200 includes the controller 220 that is in communication with the engine 202 and the electric motor 208, such as a Full Authority Digital Engine Controllers ("FADEC"). In an embodiment, the controller 220 receives commands representing a power demand on an engine and selectively connects the electric motor 208 to main drive system 201 during an emergency condition of the engine 202 (Note that, in general, while the electric motor is always 'connected,' a free-wheel clutch system or idling mode would draw minimal power so that the selective control of electricity flowing into the motor is possible by the speed controller). In an embodiment, the controller 320 receives commands to selectively connect the electric motor 308 to main drive system 301 during other power-related emergencies (i.e. an all engines operating drooped rotor state), or in a normal operation that requires a short duration increase in power. In an embodiment, the controller 320 receives commands to selectively connect the electric motor 308 to the main drive system 301 during normal operations that require a sustained increase in power. The manner in which the controller 220 operates to control the engine 202 and the electric motor 208 during normal operation and/or during contingency power may vary according to system design approaches and at a design speed. The controller 220 provides command signals to the engine 202 and the electric motor 208 according to control logic. These commands may come from a pilot or from the flight control computer ("FCC") 222 automation. The controller 220 may include memory to store instructions that are executed by a processor. The executable instructions may be stored or organized in any manner and at any level of abstraction, such as in connection with controlling the hybrid electric system 200. The processor may be any type of central processing unit ("CPU"), including a general purpose processor, a digital signal processor ("DSP"), a microcontroller, an application specific integrated circuit ("ASIC"), a field programmable gate array ("FPGA"), or the like. Also, in embodiments, the memory may include random access memory ("RAM"), read only memory ("ROM"), or other electronic, optical, magnetic, or any other computer readable medium onto which is stored the data and control algorithms for controlling the engines 202, the electric motor 208, and other operational data for the aircraft 100 (FIG. 1).

Figure 3:
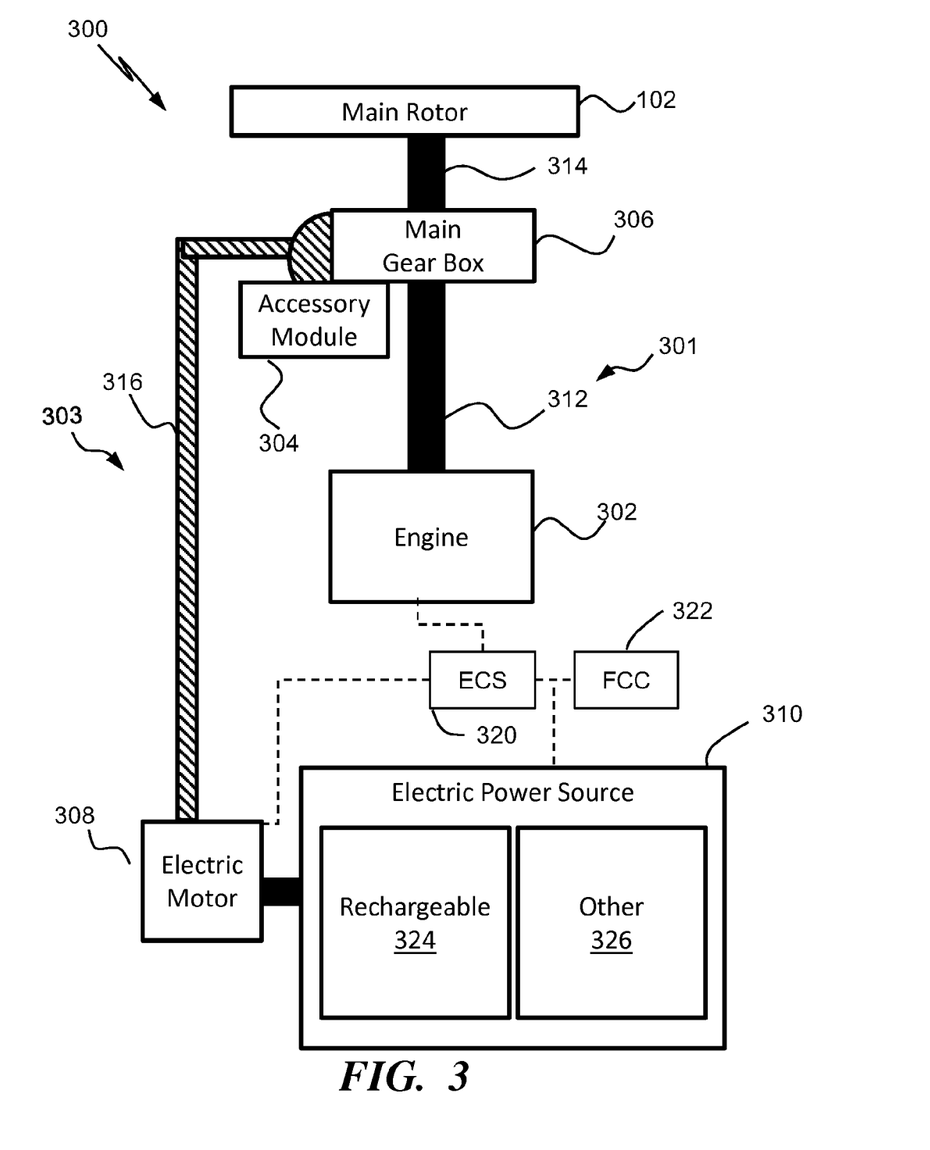
FIG. 3 depicts a hybrid electric power drive system for a rotorcraft in accordance with an alternate embodiment of the invention.

FIG. 3 illustrates a schematic view of a hybrid electric power drive system 300 (hereinafter "hybrid electric system 300") for the aircraft 100 (FIG. 1) in accordance with an alternate embodiment of the invention. The hybrid electric system 300 is substantially similar to the hybrid electric system 200 of FIG. 2, however, includes an accessory module 304 coupled to a main gearbox 306. The hybrid electric system 300 is depicted with an engine 302 of a single-engine power plant (although the hybrid electric system 300 could be implemented with the multi-engine 114a-114b power plant as shown in FIG. 1), the accessory module 304, the main gearbox 306, an electric motor 308, and an electric power source 310. It is to be understood that many of the ancillary systems may be coupled to the engine such as an engine controller, e.g., an engine control system ("ECS") 320. Other examples of ancillary systems include fuel system, pumps, etc., which are not shown in FIG. 3 for ease of description of the embodiments of the invention.

As illustrated in FIG. 3, the hybrid electric system 300 is depicted with a main drive system 301 in parallel with an auxiliary drive system 303. Main drive system 301 includes the engine 302 that is mechanically connected to an engine power shaft 312 in order to extract energy from fuel and rotate the engine power shaft 312. The engine power shaft 312 provides the motive force to drive the main rotor assembly 102, via a main rotor shaft 314, in addition to driving the tail rotor system 108 (FIG. 1) which is not pictured in FIG. 3. The main rotor assembly 102 is driven about an axis of rotation through the main gearbox 306.

The accessory module 304, e.g., an auxiliary gearbox is mechanically coupled to the main gearbox 306 and receives the mechanical energy from the engine power shaft 312 through the main gearbox 306 to drive accessories like hydraulic pumps, fuel systems, combustors, electrical generators, and other accessories. In an embodiment, the accessory module 304 includes an electric generator that also operates as the electric motor 308 to back-drive the main gearbox 306.

The auxiliary drive system 303 includes the electric power source 310 and the electric motor 308 that are connected to the main drive system 301 through a motor output shaft 316. In an embodiment, the motor output shaft 316 mechanically connects the electric motor 308 to the main gearbox 306 through an electric transmission. The electric power source 310 includes at least one of a rechargeable energy source 324 (Class A power source) and a non-rechargeable energy source 326 (Class B power source) that supplies energy to the electric motor 308 for rotationally driving the motor output shaft 316. The electric power source 310 provides energy or power to the electric motor 308, which supplements rotational power to the main rotor assembly 102 through a plurality of approaches. The rechargeable energy source 324 may include a battery bank, ultra-capacitors, flywheel energy storage systems, or the like that retrieves and stores electrical energy through a plurality of media (e.g., chemical, kinetic, electrical, or the like), while the non-rechargeable energy source 326 includes an APU, SPU, hybrid electric engine, or the like which are capable of converting energy from the stored medium to electrical energy, but not from electrical energy to a stored medium. The one or more rechargeable energy sources (324) may either be charged with energy on the ground with an external power source or in-flight with aircraft power. The electric power source 310 supplies energy to the electric motor 308 to rotate the motor output shaft 316, which in turn drives the main gearbox 306, potentially via the accessory module 304 or other transmission mechanisms, and transmits power from the motor output shaft 316 to the main rotor shaft 314. Note that motor output shaft 316 may be substantially integrated with the accessory module 304, main gearbox 306, or other power transmission components that connect the auxiliary drive system 303 to the main drive system 301.

As mentioned above, the hybrid electric system 300 supplements rotational power to the main rotor assembly 102 of the aircraft 100 through a plurality of approaches. In one approach, during an emergency condition (e.g., the engine 302 fails or the aircraft 100 is in an unsafe condition and the power plant (302) cannot supply sufficient power to navigate away from the unsafe condition), the electric motor 308 may be used to provide contingency power to achieve a safe flight condition during the emergency condition. In the emergency condition, the electric motor 308 receives electric power from the rechargeable energy source 324 and rotationally drives the main rotor shaft 314 via the main gearbox 306 and thereby, provides contingency power in a similar manner as an OEI 30 second power rating provides. In another approach, for a non-emergency condition when there is an increased power demand of the engine 302, the non-rechargeable energy source 326 may be used to provide electric power to drive the electric motor 308 for increased weight or other performance parameter capability for operations, such as during hover, during take-off, during maneuvering the aircraft 100 in high winds, or during other highly dynamic maneuvers in order to supplement primary power delivered from the engine 302 and improve overall aircraft capability. Subsequently, the electric motor 308 rotationally drives the main gearbox 306, potentially via the accessory module 304, and thereby, provides supplemental rotational power to the main rotor assembly 102 via the main rotor shaft 314. Note that the distinction of using the rechargeable energy source 324 for emergencies and the non-rechargeable energy source 326 for non-emergency conditions is for illustrative purposes only. In practice, either rechargeable power source 324 or non-rechargeable power source 326 can be used in either emergency or non-emergency operations improve appropriate performance parameters.

Also, the hybrid electric system 300 includes the controller 320 that is in communication with the engine 302 and the electric motor 308, such as a Full Authority Digital Engine Controller (FADEC). In an embodiment, the controller 320 receives commands representing a power demand on an engine and selectively connects the electric motor 308 to main drive system 301 during an emergency condition of the engine 302. In an embodiment, the controller 320 receives commands to selectively connect the electric motor 308 to main drive system 301 during other power-related emergencies (e.g., an 'all engines operating drooped rotor state') or in a normal operation that requires a short duration increase in power. In an embodiment, the controller 320 receives commands to selectively connect the electric motor 308 to the main drive system 301 during normal operations that require a sustained increase in power. The manner in which the controller 320 operates to control the engine 302 and the electric motor 308 during normal operation and/or during contingency power may vary according to system design approaches and at a design speed. The controller 320 provides command signals to the engine 302 and the electric motor 308 according to control logic. These commands may come from a pilot or from FCC 322 automation. The controller 320 may include memory to store instructions that are executed by a processor. The executable instructions may be stored or organized in any manner and at any level of abstraction, such as in connection with controlling the hybrid electric system 300. The processor may be any type of central processing unit ("CPU"), including a general purpose processor, a digital signal processor ("DSP"), a microcontroller, an application specific integrated circuit ("ASIC"), a field programmable gate array ("FPGA"), or the like. Also, in embodiments, the memory may include random access memory ("RAM"), read only memory ("ROM"), or other electronic, optical, magnetic, or any other computer readable medium onto which is stored the data and control algorithms for controlling the engines 302, the electric motor 308, and other operational data for the aircraft 100 (FIG. 1).

Figure 4:
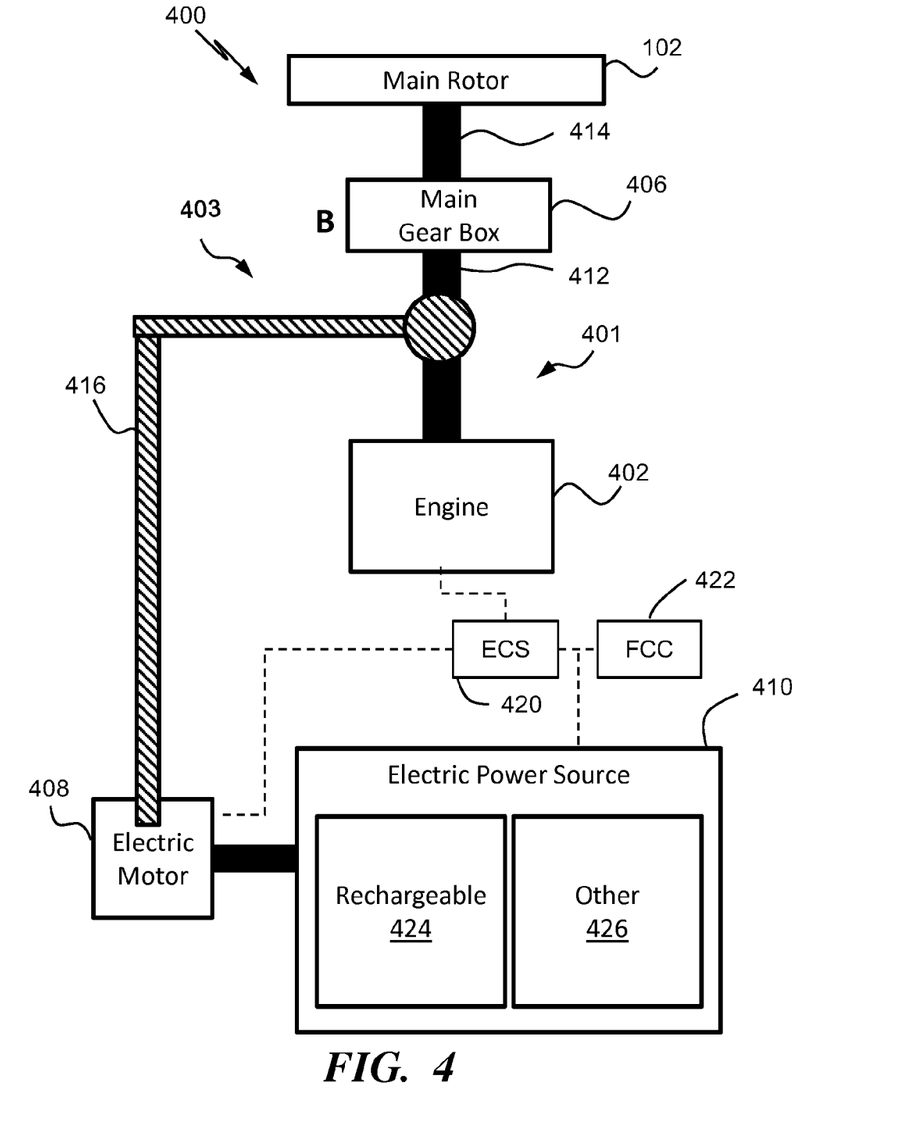
FIG. 4 depicts a hybrid electric power drive system for a rotorcraft in accordance with an alternate embodiment of the invention.

FIG. 4 depicts a schematic view of a hybrid electric power drive system 400 (hereinafter "hybrid electric system 400") for a rotorcraft (e.g., the aircraft 100 of FIG. 1) in accordance with an embodiment of the invention. The hybrid system 400 is substantially similar to the hybrid system 200 of FIG. 2, however, an auxiliary drive system 403 inserts power into the drivetrain at an engine power shaft 412 of a main drive system 401. While the mechanical connection depicted in FIG. 4 shows this connection between the engine and the gearbox, in an embodiment, this mechanical connection to the engine power shaft is on the opposite end of the engine than that depicted in FIG. 4. The hybrid electric system 400 is depicted with an engine 402 of a single-engine power plant (although the hybrid electric system 400 could be implemented with the multi-engine 114a-114b power plant as shown in FIG. 1), a main gearbox 406, an electric motor 408, and an electric power source 410. It is to be understood that many of the ancillary systems may be coupled to the engine such as an engine controller, e.g., an engine control system ("ECS") 420. Other examples of ancillary systems include fuel system, pumps, etc., which are not shown in FIG. 4 for ease of description of the embodiments of the invention.

As illustrated in FIG. 4, the hybrid electric system 400 is depicted with the main drive system 401 in parallel with the auxiliary drive system 403. The main drive system 401 includes the engine 402 that is mechanically connected to the engine power shaft 412 in order to extract energy from fuel and rotate the engine power shaft 412. The engine power shaft 412 provides the motive force to drive the main rotor assembly 102, via a main rotor shaft 414, in addition to driving the tail rotor system 108 (FIG. 1) which is not pictured in FIG. 4. The main rotor assembly 102 is driven about an axis of rotation through the main gearbox 406 by the engine 402. The auxiliary drive system 403 includes the electric power source 410 and the electric motor 408 that are connected to the main drive system 401 through a motor output shaft 416. The motor output shaft 416 mechanically connects the electric motor 408 to the engine power shaft 412. One or more electric power sources (410) (e.g., battery bank, ultra-capacitors, flywheel energy storage systems, or the like) supply energy to the electric motor 408 for rotationally driving the motor output shaft 416, which in turn rotationally drives the main gearbox 406 via the engine power shaft 412. The electric power source 410 includes at least one of a rechargeable energy source 424 (Class A power source) and a non-rechargeable energy source 426 (Class B power source) that supplies energy to the electric motor 408 for rotationally driving the motor output shaft 416. The electric power source 410 provides energy or power to the electric motor 408, which supplements rotational power to the main rotor assembly 102 through a plurality of approaches. The rechargeable energy source 424 includes a battery bank, ultra-capacitors, flywheel energy storage systems, or the like that retrieves and stores electrical energy through a plurality of media, e.g., chemical, kinetic, electrical, etc. The non-rechargeable energy source 426 includes an APU, SPU, hybrid electric engine, or the like, which are capable of converting energy from the stored medium to electrical energy. The one or more rechargeable energy sources (424) may either be charged with energy on the ground with an external power source or in-flight with aircraft power. The electric power source 410 supplies energy to the electric motor 408 to rotate the motor output shaft 416, which in turn drives the engine power shaft 412 and transmits power to the main rotor shaft 414 via the main gearbox 406. Note that motor output shaft 416 may be substantially integrated with and may be difficult to distinguish from the engine power shaft 412 or other power transmission components that connect the auxiliary drive system 403 to the main drive system 401.

As mentioned above, the hybrid electric system 400 supplements rotational power to the main rotor assembly 102 of the aircraft 100 through a plurality of approaches. In one approach, during an emergency condition (e.g., the engine 402 fails or the aircraft 100 is in an unsafe condition and power plant cannot supply sufficient power to navigate away from the unsafe condition), the electric motor 408 may be used to provide contingency power to achieve a safe flight condition during the emergency condition. In the emergency condition, the electric motor 408 receives electric power from the rechargeable energy source 424 and rotationally drives the engine power shaft 412 via the motor output shaft 416 and thereby, provides contingency power in a similar manner as a OEI 30 second power rating would provide. In another approach, for a non-emergency condition when there is an increased power demand of the engine 402, the non-rechargeable energy source 426 may be run to provide electric power to drive the electric motor 408 for increased weight or other performance parameter capability for operations, such as during hover, during take-off, during maneuvering the aircraft 100 in high winds, or during other highly dynamic maneuvers, in order to supplement primary power delivered from the engine 402 and improve overall aircraft capability or efficiency. Subsequently, the electric motor 408 rotationally drives the main gearbox 406 via the engine power shaft 412 and thereby, provides supplemental power to the main rotor assembly 102 via the main rotor shaft 414. Note that the distinction of using the rechargeable energy source 424 for emergencies and the non-rechargeable energy source 426 for non-emergency conditions is for illustrative purposes only. In operation, either rechargeable power source 424 or non-rechargeable power source 426 can be used in either emergency or non-emergency operations improve appropriate performance parameters.

Also, the hybrid system 400 includes the controller 420 that is in communication with the engine 402 and the electric motor 408, such as a Full Authority Digital Engine Controller (FADEC). In an embodiment, the controller 420 receives commands representing a power demand on an engine and selectively connects the electric motor 408 to the main drive system 401 during an emergency condition of the engine 402. In an embodiment, the controller 420 receives commands to selectively connect the electric motor 408 to the main drive system 401 during other power-related emergencies (e.g., an 'all engines operating drooped rotor state'), or in a normal operation that requires a short duration increase in power. In an embodiment, the controller 420 receives commands to selectively connect the electric motor 408 to the main drive system 401 during normal operations that require a sustained increase in power. The manner in which the controller 420 operates to control the engine 402 and the electric motor 408 during normal operation and/or during contingency power may vary according to system design approaches and at a design speed. The controller 420 provides command signals to the engine 402 and the electric motor 408 according to control logic. These commands may come from a pilot or from FCC 422 automation. The controller 420 may include memory to store instructions that are executed by a processor. The executable instructions may be stored or organized in any manner and at any level of abstraction, such as in connection with controlling the hybrid system 400. The processor may be any type central processing unit ("CPU"), including a general purpose processor, a digital signal processor ("DSP"), a microcontroller, an application specific integrated circuit ("ASIC"), a field programmable gate array ("FPGA"), or the like. Also, in embodiments, the memory may include random access memory ("RAM"), read only memory ("ROM"), or other electronic, optical, magnetic, or any other computer readable medium onto which is stored the data and control algorithms for controlling the engines 402, the electric motor 408, and other operational data for rotorcraft (e.g., the aircraft 100 of FIG. 1).

Benefits of embodiments described include providing a short duration boost of power to rotors of a rotorcraft during an emergency condition (e.g., during failure of an engine during an energy state of one or more engines in a single-engine or a multi-engine aircraft, or in any other unsafe flight condition where the power-plant is not capable of providing sufficient power to achieve a safe-flight condition). For example, during an emergency condition, the hybrid electric power drive system, via a rechargeable energy source, provides an immediate application of contingency power to an aircraft which may not be available during multiple engine operation or single-engine operation, or alternatively, to supplement OEI 30 second power from the turbine engines to get past an emergency condition. Other benefits include providing an increased power to the rotors of the rotorcraft during normal operation by various implementations. An example of a normal operation benefit would be for the hybrid electric power drive system, via a rechargeable energy source, to provide an immediate application of power during normal operations in which the engine may be slow to respond to the demand for power until such time as the engine may provide the demanded power. During another normal operation, the rechargeable energy source may provide a short duration power boost to allow the aircraft to quickly transition through a critical transient phase of aircraft operation such as confined area takeoffs or rotor startup in high winds. During another normal operation, a non-rechargeable energy source may be used to provide electric power to drive the rotors for an increased weight or other performance parameter capability for operations, such as during hover, during other takeoffs, during maneuvering the rotorcraft in high winds, or during other highly dynamic maneuvers, or in order to supplement primary power delivered from the engine 402 and improve overall aircraft capability or efficiency. Another benefit of the invention is that the existence of the hybrid electric power drive system on the aircraft presents the designer with additional design parameters that may be optimized which may allow the aircraft manufacturer to request less power from the engine manufacture's time-limited engine ratings and as such allow for longer engine overhaul times and reduced overall system cost. Additionally, note that the distinction of using the rechargeable energy source for emergencies and the non-rechargeable energy source for non-emergency conditions is for illustrative purposes only. In practice, either a rechargeable power source or a non-rechargeable power source can be used in many emergency or non-emergency operations to improve appropriate performance parameters.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid power drive system for an aircraft, comprising:
    a rotor;
    a first power drive sub-system including at least one engine in connection with the rotor and configured to provide a first power to the rotor;
    a second power drive sub-system connected in parallel to the first power drive sub-system and configured to supplement, with a second power, the first power delivered to the rotor during operation of the aircraft, a motor output shaft of the second power drive sub-system being in direct mechanical communication with the first power drive sub-system at a main rotor shaft; and
    an electric power source configured to provide a third power to the second power drive sub-system,
    wherein the second power drive sub-system includes an electric motor in electric communication with a rechargeable energy source and a non-rechargeable energy source.

2. The hybrid power drive system of claim 1, wherein the rechargeable energy source is selected from a list, wherein the list includes at least one of a battery, a capacitor, and a flywheel energy storage sub-system.

3. The hybrid power drive system according to claim 1, wherein the rechargeable energy source is configured to provide power to the rotor during a transient high power demand condition.

4. The hybrid power drive system of claim 1, wherein the non-rechargeable energy source is selected from a list, wherein the list includes an auxiliary power unit, supplemental power unit, and a hybrid electric engine.

5. The hybrid power drive system according to claim 1, wherein the non-rechargeable energy source is configured to provide longer duration supplemental rotational power to the rotor during an increased power demand on the engine.

6. The hybrid power drive system according to claim 1, wherein the first power is a main power, the first power drive sub-system is a main power drive sub-system, the second power is a supplemental rotational power, and the second power drive sub-system is an auxiliary power drive sub-system.

7. A method for controlling a hybrid power drive system of an aircraft, comprising:
    receiving a signal indicative of a power demand on a rotor;
    connecting in parallel a first power drive sub-system and a second power drive sub-system, a motor output shaft of the second power drive sub-system being in direct mechanical communication with the first power drive sub-system at a main rotor shaft;
    connecting an electric power source to the second power drive sub-system;
    supplying a second power from the second power drive sub-system to the first power drive sub-system to provide power to the rotor; and
    supplying energy to the electric motor from a rechargeable energy source and a non-rechargeable energy source.

8. The method of claim 7, wherein the connecting of the first power drive sub-system to the second power drive sub-system further comprises connecting an electric motor to the first power drive sub-system.

9. The method according to claim 7, further comprising:
    connecting the electric motor to the first power drive sub-system via at least one of a main rotor shaft, a gearbox, and an engine power shaft.

10. The method according to claim 7, wherein the first power is a main power, the first power drive sub-system is a main power drive sub-system, the second power is a contingency power, and the second power drive sub-system is an auxiliary power drive sub-system.

* * * * *